United States Patent Office
3,472,894
Patented Oct. 14, 1969

3,472,894
PERFLUOROALKYL ETHER BIS(HYDROXY-ALKYL) AMIDES
Philip Lee Bartlett, Wilmington, Del., assignor to E. I. du Pont de Nemours and Company, Wilmington, Del., a corporation of Delaware
No Drawing. Continuation-in-part of application Ser. No. 621,148, Mar. 7, 1967. This application Feb. 16, 1968, Ser. No. 705,947
Int. Cl. C07c 103/38
U.S. Cl. 260—561    10 Claims

ABSTRACT OF THE DISCLOSURE

Perfluoroalkyl ether bis(hydroxyalkyl) amides of the formula $R_fO(C_3F_6O)_nCF(CF_3)CON(C_pH_{2p}OH)_2$ are useful as surface active agents for water or antiwetting agents and are noncorrosive to steel.

CROSS-REFERENCE TO RELATED APPLICATION

This is a continuation-in-part of application Ser. No. 621,148, filed Mar. 7, 1967 and now abandoned.

BACKGROUND OF THE INVENTION

This invention relates to prefluoroalkyl ether bis- (hydroxyalkyl) amides. In U.S. Patent 2,541,088, Nikawitz discloses textile agents of the formula

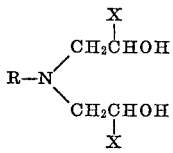

wherein R is an alkyl radical of 8–18 carbons and X is hydrogen or methyl. In U.S. Patent 2,764,603 Ahlbrecht teaches that perfluoroalkylamidopolymethylene dialkylamines of the formula

are surface active agents for oils and waxes, but are relatively insoluble in water. In U.S. Patent 3,274,244 Mackenzie teaches polyfluoropolyoxa-alkanamidoalkanols of the formula

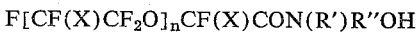

wherein X is F or $CF_3$, $n$ is 2–6, R' is H or $C_1$ to $C_4$ alkyl, and R" is $C_2$ to $C_4$ alkylene which are useful as intermediates in the preparation of the corresponding phosphoric acid diesters.

DESCRIPTION OF THE INVENTION

It has now been discovered that certain perfluoroalkyl ether bis(hydroxyalkyl) amides are useful as surface active agents for water or antiwetting agents and have corrosion inhibiting properties toward steel. These compounds are of the formula

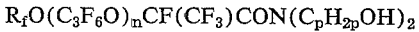

wherein $R_f$ is a perfluoroalkyl group of 1–6 carbons, $n$ is an integer from 0–8, $p$ is an integer from 2–4 and the hydroxyl group of $—C_pH_{2p}OH$ is not attached to a carbon attached to nitrogen.

The starting materials for preparing the products of this invention are the perfluoroalkyl ether acid fluorides of the formula $R_fO(C_3F_6O)_nCF(CF_3)CFO$. These acid fluorides are available from two sources, polymerization of hexafluoropropylene oxide and polymerization of mixtures of hexafluoropylene and oxygen.

The acid fluorides prepared by the polymerization of hexafluoropropylene oxide are taught by Moore et al. in U.S. Patent 3,250,808 and have the structure

If hexafluoropropylene oxide alone is polymerized, the products are $n\text{-}C_3F_7O[CF(CF_3)CF_2O]_nCF(CF_3)COF$ as described more fully by Moore in Canadian Patent 725,-740. If the polymerization is carried out in the presence of carbonyl fluoride ($COF_2$) or a perfluoroacid fluoride of the formula $F(CF_2)_mCFO$, as described more fully in French Patent 1,362,548, the product is of the formula $F(CF_2)_mCF_2O[CF(CF_3)CF_2O]_mCF(CF_3)CFO$ where $m$ is 0–5. When the polymerization is carried out in the presence of a perfluoroketone of the formula $F(CF_2)_xC(O)(CF_2)_yF$, as described by Selman in U.S. Patent 3,274,239, the product is of the formula

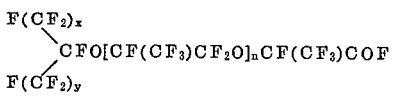

where $x$ and $y$ are 1–4 and the total of $x+y$ is 2–5. Thus, $R_f$ may be a branched or straight chain perfluoroalkyl group of 1–6 carbon atoms.

The acid fluorides prepared by polymerization of mixtures of hexafluoropropylene and oxygen are taught by Pasetti, Sianesi and Corti in Die Makromolekulare Chemie, 86, pp. 308–311 (1965); Sianesi and Fontanelli in Die Makromolekular Chemie, 102, pp. 115–124 (1967); and French Patent 1,434,537. The polymerization is carried out at temperatures of about —100° C. to 25° C. in the presence of ultraviolet radiation. Unlike the products obtained from the polymerization of hexafluoropropylene oxide, these polymers have backbones which are not in a regular head to tail arrangement; they contain both head to head and tail to tail as well as head to tail arrangements. These polymeric acid fluorides are thus best represented by the formula $R_fO(C_3F_6O)_nCF(CF_3)CFO$. Generically, the polymers from hexafluoropropylene oxide and hexafluoropropylene-oxygen mixtures are best represented by this more general formula.

One method of preparing the perfluoroalkyl ether bis-(hydroxyalkyl) amides of this invention of the formula

is by reaction of the perfluoroalkyl ether acid fluoride with a bis(hydroxyalkyl) amine of the formula

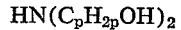

in which $p$ is an integer from 2–4 and the hydroxyl group of—$C_pH_{2p}OH$ is not attached to a carbon attached to nitrogen.

Suitable bis(hydroxyalkyl)amines include those in which the —$C_pH_{2p}OH$ group is 2-hydroxyethyl, 3-hydroxy-1-propyl, 2-hydroxy-1-propyl, 2-hydroxy-1-butyl, 3-hydroxy-2-butyl, 4-hydroxy-1-butyl and 3-hydroxy-1-butyl. Such dialkanolamines are readily available by several means. The most common is reaction of ammonia with two moles of an alkylene oxide giving dialkanolamines such as diethanolamine, di-2-hydroxy-1-propylamine, di-2-hydroxy-1-butylamine and di-3-hydroxy-2-butylamine. Other methods include the addition of ammonia to acrolein followed by reduction to di-3-hydroxy-1-propylamine, to crotonaldehyde followed by reduction to di-1-hydroxy-3-butylamine, or to methyl vinyl ketone followed by reduction to di-3-hydroxy-1-butylamine.

Reaction of ammonia with two moles of a haloalkanol such a chloroalkanol or a bromoalkanol of the formula $$XC_pH_{2p}OH$$

for example 3-chloro-1-propanol, 4-chloro-1-butanol, 3-chloro-2-butanol and 4-chloro-2-butanol, may also be used to prepare bis(hydroxyalkyl)amines such as di-3-hydroxy-1-propylamine, di-4-hydroxy-1-butylamine, di-3-hydroxy-2-butylamine, di-3-hydroxy-1-butylamine and the like.

Reaction of the perfluoroalkyl ether acid fluoride with the bis(hydroxyalkyl)amine can be carried out in the presence of a solvent or with excess amine. When a solvent is used, a simple amine such as pyridine is usually included to remove the HF formed. The Schotten-Baumann procedure using aqueous alkali may also be used. Regardless of the procedure, temperatures in the range of about 20° C. to the reflux temmperature of the reaction mass are generally used, preferably from 20° to 50° C.

In most cases it is preferred to prepare the products of this invention by first converting the perfluoroalkyl ether acid fluoride to the corresponding alkyl perfluoroalkyl ether acid ester and preferably the methyl ester of the formula $R_fO(C_3F_6O)_nCF(CF_3)CO_2CH_3$. These esters are prepared by standard esterification methods, for example by the reaction of the acid fluoride with an alkanol such as methanol as taught by Diesslin et al. in U.S. Patent 2,567,011, and by Moore et al., in U.S. Patent 3,250,808. Preferably, the esterification is carried out by reacting the perfluoroalkyl ether acid fluoride with excess methanol at 10–20° C., optionally in an inert solvent, in the presence of sufficient pyridine to consume the hydrogen fluoride formed. In place of methanol one can also use ethanol, propanol, butanol or the like equally well.

The product of this invention is then prepared by reacting the alkyl ester with the bis(hydroxyalkyl)amine. This reaction is carried out, usually in an inert solvent, at temperatures from about 20° C. to the reflux temperature of the reaction mass. Any solvent which dissolves both reactants and products and is inert toward the ester and amine is useful. Preferably the solvent should also have a lower boiling point than the desired product to facilitate isolation of product. Preferred solvents are ethers such as diethyl ether and dioxane. Preferred reaction temperatures range from about 20° to 60° C., depending on the solvent used.

Another procedure for preparing the compounds of this invention is a two step process starting with the perfluoroalkyl ether acid fluoride. This procedure is carried out by first preparing a perfluoroalkyl ether amide of the formula $R_fO(C_3F_6)_nCF(CF_3)CONH_2$ by reacting the corresponding acid fluoride with ammonia as taught in the above cited Dresslin et al. and Moore et al. patents. The perfluoroalkyl ether amide is then converted to the sodio derivative of the formula $$[R_fO(C_3F_6O)CF(CF_3)CONH]^-Na^+$$

by reaction with sodium or a sodium compound such as sodium hydride. The sodio derivative is then reacted with a haloalkanol of the formula $XC_pH_{2p}OH$ where X is a halogen such as F, Cl, Br or I, and preferably Cl or Br, to form a perfluoroalkyl ether mono(hydroxyalkyl)amide of the formula $$R_fO(C_3F_6O)_nCF(CF_3)CONH—C_pH_{2p}OH$$

The mono(hydroxyalkyl)amide is then converted to the sodio derivative of the formula $$[R_fO(C_3F_6O)_nCF(CF_3)CONC_pH_{2p}OH]^-Na^+$$

and treated with haloalkanol, as before, to give the corresponding bis(hydroxyalkyl)amide. Useful examples of haloalkanols include ethylene chlorohydrin, ethylene bromohydrin, trimethylene chlorohydrin, trimethylene bromhydrin, 2-chloro-1-butanol, 4-chloro-1-butanol, 3-chloro-2-butanol, 3-bromo-2-butanol, and the like.

Alternatively, the perfluoroalkyl ether acid fluoride or the corresponding acid ester may be converted to the perfluoroalkyl ether mono(hydroxyalkyl)amide by reaction with a monoalkanolamine of the formula $$H_2NC_pH_{2p}OH$$

such as ethanolamine, 2-hydroxy-1-propylamine, 2-hydroxy-1-butylamine, 3-hydroxy-2-butylamine, or 3-hydroxy-1-propylamine, using the procedures described in the above cited Mackenzie patent or those described above for reaction of the acid fluoride or ester with the bis(hydroxyalkyl)amine. The perfluoroalkyl ether mono(hydroxyalkyl)amide is then converted to the sodio derivative and treated with a haloalkanol as before.

While specific schemes have been described for preparing the compounds of this invention, it is not intended that this invention be limited to any particular method of synthesis. Other methods may occur to those skilled in the art.

When $n$ is 0–1, the products of this invention of the formula $R_fO(C_3F_6O)_nCF(CF_3)CON(C_pH_{2p}OH)_2$ are useful as surface active agents in aqueous systems, for example as emulsifying agents, dispersants, wetting agents, foaming agents, and the like. These products are particularly useful as dispersing agents for aqueous emulsion polymerizations. They are useful as surface active agents at concentrations of about 0.001–10% by weight of the aqueous system.

All of the products of this invention, that is, those in which $n$ is 0–8, are effective as anticorrosion agents for steel. The products wherein $n$ is 0–1 are particularly useful as surface active agents in applications where they come in contact with steel such as in steel treating processes, in example in pickling baths. Those products wherein $n$ is 2–8 are useful for other purposes. For example, they are useful as antiwetting agents in applications requiring mold release agents, release agents for glass, and flotation agents. The preferred products of this invention are those obtained from the polymerization of hexafluoropropylene oxide and hence of the formula $$R_fO[CF(CF_3)CF_2O]_nCF(CF_3)CON(C_pH_{2p}OH)_2$$

The following examples, illustrating the preparation and utility of the novel compounds of this invention, are given. All parts and percentages are by weight.

EXAMPLE 1

Perfluoroalkyl ether esters were prepared as follows:
(A) A solution of 450 parts of $$n\text{-}C_3F_7OCF(CF_3)CF_2OCF(CF_3)CFO$$

prepared by the polymerization of hexafluoropropylene oxide and 100 parts of pyridine in 500 parts of anhydrous diethyl ether was cooled to 10–15° C. under anhydrous conditions. Then 100 parts of anhydrous methanol was added over a period of one hour with agitation while maintaining the temperature of the reaction mass at 10–15° C. Agitation was continued for four hours at 10–15° C., then the pyridine hydrofluoride was collected by filtration and the filtrate was washed twice with 250 parts of water, twice with 250 parts of 5% aqueous sodium bicarbonate solution and finally five times with water until the final wash water was neutral. The ether solution was dried over anhydrous sodium sulfate and the ether was evaporated. The residue was distilled under reduced pressure, giving 430 parts (93.3% of theory) of $n\text{-}C_3F_7OCF(CF_3)CF_2OCF(CF_3)CO_2CH_3$, B.P. 43° C. at 9 mm. Hg.

(B) Using essentially the same procedure, the methyl ester, $n\text{-}C_3F_7OCF(CF_3)CO_2CH_3$, B.P. 109–110° C. at 760 mm. Hg, was prepared in 75.1% yield from 200.0 parts of the acid fluoride and 50.0 parts of methanol. Likewise, the methyl esters, $CF_3OCF(CF_3)CO_2CH_3$,
$CF_3OCF(CF_3)CF_2OCF(CF_3)CO_2CH_3$,
$C_2F_5OCF(CF_3)CO_2CH_3$,
$C_2F_5OCF(CF_3)CF_2OCF(CF_3)CO_2CH_3$,
$(CF_3)_2CFOCF(CF_3)CO_2CH_3$,
$(CF_3)_2CFOCF(CF_3)CF_2OCF(CF_3)CO_2CH_3$,
$n\text{-}C_4F_9OCF(CF_3)CO_2CH_3$,
$n\text{-}C_4F_9OCF(CF_2)CF_2OCF(CF_3)CO_2CH_3$,
$n\text{-}C_6F_{13}OCF(CF_3)CO_2CH_3$,
$n\text{-}C_6F_{13}OCF(CF_3)CF_2OCF(CF_3)CO_2CH_3$,
$n\text{-}C_3F_7O[CF(CF_3)CF_2O]_2CF(CF_3)CO_2CH_3$ and
$n\text{-}C_3F_7O[CF(CF_3)CF_2O]_8CF(CF_3)CO_2CH_3$ can be prepared from the corresponding acid fluorides by the same procedure.

EXAMPLE 2

Perfluoroalkyl ether bis(hydroxyalkyl)amides were prepared as follows:

(A) A mixture of 100 parts of $n\text{-}C_3F_7OCF(CF_3)CF_2OCF(CF_3)CO_2CH_3$ and 200 parts of p-dioxane was heated to 50° C. and 18.7 parts of diethanolamine in 75 parts of anhydrous methanol was added over a period of one hour. Heating at 50° C. was continued for four additional hours. The solvent was then evaporated at a temperature of 50° C. and a reduced pressure of 5 mm. Hg giving 87.6 parts (85.2% of theory) of $n\text{-}(C_3F_7OCF(CF_3)CF_2OCF(CF_3)CON(CH_2CH_2OH)_2$ as a viscous oil.

*Analysis.*—Calc'd for $C_{13}H_{10}F_{17}O_5N$: N, 2.40; F, 55.4. Found: N, 2.80; F, 54.7.

(B) Using essentially the same procedure, 100.0 parts of $n\text{-}C_3F_7OCF(CF_3)CO_2CH_3$ was reacted with 30.6 parts of diethanol amine to give 115.7 parts of $n\text{-}C_3F_7OCF(CF_3)CON(CH_2CH_2OH)_2$ as a viscous oil in 94.8% yield.

*Analysis.*—Calc'd for $C_{10}H_{10}F_{11}O_4N$: N, 3.34; F, 49.8. Found: N, 3.21; F, 49.7.

(C) Using the procedure of part (A), $n\text{-}C_3F_7O[CF(CF_3)CF_2O]_2CF(CF_3)CO_2CH_3$ was reacted with diethanolamine to give $n\text{-}C_3F_7O[CF(CF_3)CF_2O]_2CF(CF_3)CON(CH_2CH_2OH)_2$

*Analysis.*—Calc'd for $C_{16}H_{10}F_{23}O_6N$: F, 58.4; N, 1.9. Found: F, 58.1; N, 1.9.

(D) Using the procedure of part (A), $n\text{-}C_3F_7O[CF(CF_3)CF_2O]_8CF(CF_3)CO_2CH_3$ was reacted with diethanolamine to give $n\text{-}C_3F_7O[CF(CF_3)CF_2O]_8CF(CF_3)CON(CH_2CH_2OH)_2$

*Analysis.*—Calc'd for $C_{34}H_{10}F_{59}O_{12}N$: F, 64.2; N, 0.8. Found: F, 64.0; N, 0.7.

Following the same procedure, any one of the esters, $CF_3OCF(CF_3)CO_2CH_3$,
$CF_3OCF(CF_3)CF_2OCF(CF_3)CO_2CH_3$,
$C_2F_5OCF(CF_3)CO_2CH_3$,
$C_2F_5CF(CF_3)CF_2OCF(CF_3)CO_2CH_3$,
$n\text{-}C_4F_9CF(CF_3)CO_2CH_3$,
$n\text{-}C_4F_9OCF(CF_3)CF_2OCF(CF_3)CO_2CH_3$,
$(CF_3)_2CFOCF(CF_3)CO_2CH_3$ and
$(CF_3)_2CFOCF(CF_3)CF_2OCF(CF_3)CO_2CH_3$ can be reacted with any of the bis(hydroxyalkyl)amines, $HN(CH_2CHCH_3)_2$, $HN(CH_2CH_2CH_2OH)_2$,
            |
            OH $HN(CH_2CHCH_2CH_3)_2$, $HN(CHCHCH_3)_2$, $HN(CH_2CH_2CH_2CH_2OH)$,
          |                |
          OH               CH_3

$HN(CH_2CH_2CHCH_3)_2$ and $HN(CHCH_2CH_2OH)_2$
                        |                |
                        OH               CH_3 to give the corresponding bis(hydroxyalkyl)amide product.

EXAMPLE 3

Sodium hydride (2.5 parts) was added with caution to a solution of 50.0 parts of $n\text{-}C_3F_7OCF(CF_3)CF_2OCF(CF_3)CONH_2$ in 100.0 parts of anhydrous tetrahydrofuran over a period of 3 hours at 25° C. When the reaction was complete, 11.0 parts of 4-chloro-1-butanol were added over a period of 2 hours and the resulting mass was maintained at 25° C. for 3 hours. A further 2.5 parts of sodium hydride was added, followed by 11.0 parts of 4-chloro-1-butanol, using the same procedure as the first steps of the reaction sequence. The resulting mass was maintained at 25° C. for 3 hours. Sodium chloride was collected by filtration and the solvent was evaporated from the filtrate, giving 64.3 parts (95.3% yield) of $n\text{-}C_3F_7OCF(CF_3)CF_2OCF(CF_3)CON(CH_2CH_2CH_2CH_2OH)_2$ as a viscous oil.

*Analysis.*—Calculated for $C_{17}H_{18}F_{17}O_5N$: N, 2.10; F, 48.4. Found: N, 2.07; F, 48.3.

EXAMPLE 4

Utility as surface active agents was determined as follows:

Surface activities of aqueous solutions of products prepared above were determined using a Du Nooy Tensiometer. The results are shown in the following table. Water containing no additive had a surface tension of 72 dynes per centimeter at 25° C.

TABLE

| Surface active agent | Surface tension, dynes/cm. at 25°C. concentration, percent | | | | | | |
| --- | --- | --- | --- | --- | --- | --- | --- |
|  | 0.005 | 0.01 | 0.05 | 0.1 | 0.5 | 1.0 | 10.0 |
| n-C_3F_7OCF(CF_3)CON(CH_2CH_2OH)_2 | 36.5 | 33.8 | 28.2 | 26.2 | 21.0 | 19.7 | 18.1 |
| n-C_3F_7OCF(CF_3)CF_2OCF(CF_3)CON(CH_2CH_2OH)_2 | 23.0 | 18.2 | 17.2 | 17.1 | 15.5 | 15.4 | 14.2 |
| n-C_3F_7OCF(CF_3)CF_2OCF(CF_3)CON(CH_2CH_2CH_2CH_2OH)_2 | 26.3 | 21.4 | 20.7 | 20.1 | 18.7 | 18.3 | 16.8 |

Attempts were also made to measure the surface tension of aqueous solutions of $n\text{-}C_3F_7O[CF(CF_3)CF_2O]_2CF(CF_3)CON(CH_2CH_2OH)_2$ which is within the scope of this invention, and $n\text{-}C_3F_7OCF(CF_3)CONHCH_2CH_2OH$ and $n\text{-}C_3F_7OCF(CF_3)CF_2OCF(CF_3)CONHCH_2CH_2OH$ which are not within the scope of this invention. All three of these compounds were too insoluble in water to have any effect on its surface tension.

EXAMPLE 5

Utility of water-insoluble products as anticorrosion agents was determined as follows:

Two Type 1020 mild steel test coupons were both treated with a different 1.0% solution of one of the following products in trichlorotrifluoroethane for five minutes and then air dried. The products used were:

$$n\text{-}C_3F_7O[CF(CF_3)CF_2O]_2CF(CF_3)CON(CH_2CH_2OH)_2$$

and $$n\text{-}C_3F_7O[CF(CF_3)CF_2O]_8CF(CF_3)CON(CH_2CH_2OH)_2$$

The coupons were then immersed to one-half their length in 10% aqueous hydrochloric acid and allowed to stand for five days at ambient temperature. Neither of the two coupons showed any evidence of corrosion on their surfaces which remained bright.

For comparison, another Type 1020 mild steel test coupon which had not been surface treated was immersed in 10% aqueous hydrochloric acid and allowed to stand for five days at ambient temperature. The coupon turned black and was badly corroded.

EXAMPLE 6

Utility as release agents for metal surfaces was determined as follows:

Two Type 1020 mild steel test coupons were each treated with a different one of the two 1.0% trichlorotrifluoroethane solutions described in Example 5 for five minutes and air dried as before. To test the antiwetting or release properties of the treated surfaces, each treated coupon was bonded to an untreated coupon with a typical epoxy resin metal bonding agent (Shell "Epon" 828 cured with diethylenetriamine). In each case the bond could be broken easily by hand.

For comparison, two untreated Type 1020 mild steel test coupons were bonded together with the same bonding agent. The bond was very strong and could not be broken by hand.

EXAMPLE 7

Utility as release agents for glass surfaces was determined as follows:

Two glass slides were each treated with a different one of the two 1.0% trichlorotrifluoroethane solutions described in Example 5 for five minutes and then air dried. The treated slides were then coated with poly (methyl-2-cyanoacrylate) which is known to be a good adhesive for glass. After setting, the adhesion of the resin coatings to the glass was tested. In both cases, the coatings were easily removed with a knife.

For comparison, a similar coating was placed on an untreated glass slide. The film was strongly bonded to the glass as evidenced by the fact that it was not easily removed with a knife.

EXAMPLE 8

Usefulness as flotation agents was determined as follows:

One drop of one of the 1% trichlorotrifluoroethane solutions of Example 5 was added to each of three beakers, each containing 100 ml. of water. One drop of the other of the 1% trichlorotrifluoroethane solutions of Example 5 was also added to three different beakers, each containing 100 ml. of water. For each solution, to one beaker was added powdered $Cr_2O_3$, to the second was added powdered $Cu_2O$, and to the third was added powdered $Fe_2O_3$. For comparison, similar samples of powdered $Cr_2O_3$, $Cu_2O$ and $Fe_2O_3$ were also added to beakers containing 100 ml. of water, but no added solution. In all cases when the trichlorotrifluoroethane solution was present, the powdered oxide floated. When only water was present, the powdered oxide sank.

In each of the preceding examples, one may substitute the corresponding compounds containing the group $$R_fO(C_3F_6)_nCF(CF_3)\text{---}$$

derived from the polymerization of hexafluoropropylene and oxygen with essentially equivalent results.

The embodiments of the invention in which an exclusive property or privilege is claimed are defined as follows:

1. A perfluoroalkyl ether bis(hydroxyalkyl amide of the formula $$R_fO(C_3F_6O)_nCF(CF_3)CON(C_pH_{2p}OH)_2$$

wherein $R_f$ is a perfluoroalkyl group of 1–6 carbons, $n$ is an integer from 0–8, $p$ is an integer from 2–4 and the hydroxyl group of —$C_pH_{2p}OH$ is not attached to a carbon attached to nitrogen.

2. The amides of claim 1 of the formula $$R_fO[CF(CF_3)CF_2O]_nCF(CF_3)CON(C_pH_{2p}OH)_2$$

3. The amides of claim 2 in which $n$ is 0–1.
4. The amides of claim 2 in which $p$ is 2.
5. The amides of claim 2 in which $R_f$ is $n\text{-}C_3F_7$.
6. The amides of claim 4 in which $R_f$ is $n\text{-}C_3F_7$.
7. The amide of claim 6 of the formula $$n\text{-}C_3F_7OCF(CF_3)CON(CH_2CH_2OH)_2$$

8. The amide of claim 6 of the formula $$n\text{-}C_3F_7OCF(CF_3)CF_2OCF(CF_3)CON(CH_2CH_2OH)_2$$

9. The amide of claim 6 of the formula $$n\text{-}C_3F_7O[CF(CF_3)CF_2O]_2CF(CF_3)CON(CH_2CH_2OH)_2$$

10. The amide of claim 6 of the formula $$n\text{-}C_3F_7O[CF(CF_3)CF_2O]_8CF(CF_3)CON(CH_2CH_2OH)_2$$

References Cited

UNITED STATES PATENTS

| | | | |
|---|---|---|---|
| 2,541,088 | 2/1951 | Nikawitz | 260—584 |
| 3,274,239 | 9/1966 | Selman | 260—514 |
| 3,274,244 | 9/1966 | Mackenzie | 260—561 |

ALEX MAZEL, Primary Examiner

J. A. NARCAVAGE, Assistant Examiner

U.S. Cl. X.R.

65—24; 106—2; 204—158; 252—61, 350, 357, 358, 390; 260—338, 487, 544; 264—41